(No Model.)

J. G. BAKER.
GRATER.

No. 524,189.  Patented Aug. 7, 1894.

WITNESSES
R. Schleicher
Chas. Amon

INVENTOR
John G. Baker
By his Attorneys
Howson & Howson

UNITED STATES PATENT OFFICE.

JOHN G. BAKER, OF PHILADELPHIA, PENNSYLVANIA.

GRATER.

SPECIFICATION forming part of Letters Patent No. 524,189, dated August 7, 1894.

Application filed April 21, 1894. Serial No. 508,392. (No model.)

*To all whom it may concern:*

Be it known that I, JOHN G. BAKER, a citizen of the United States, residing in Philadelphia, Pennsylvania, have invented certain Improvements in Graters, of which the following is a specification.

The object of my invention is to construct a grating device which can be cheaply made, which is extremely durable, and is very efficient in action.

Figure 3:
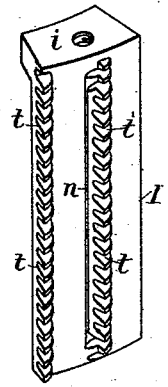
Figure 1:
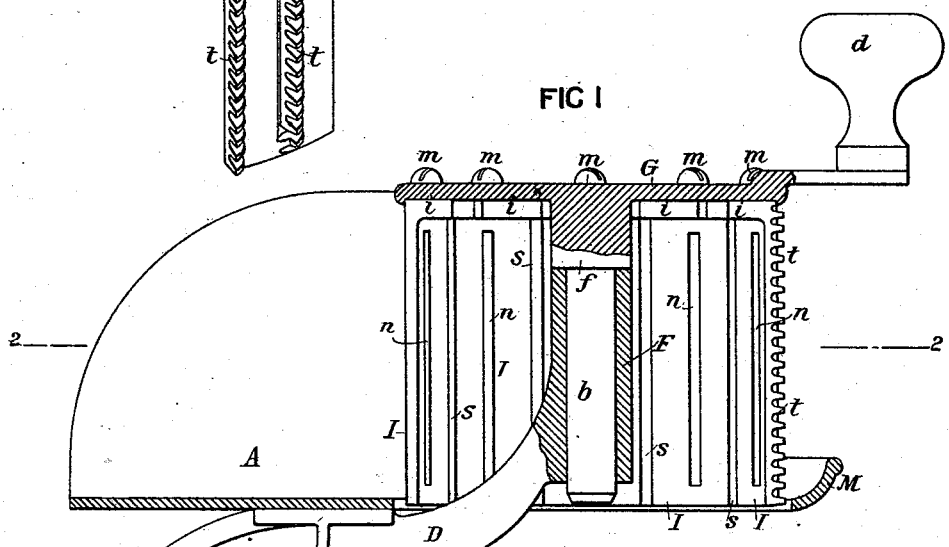
Figure 2:
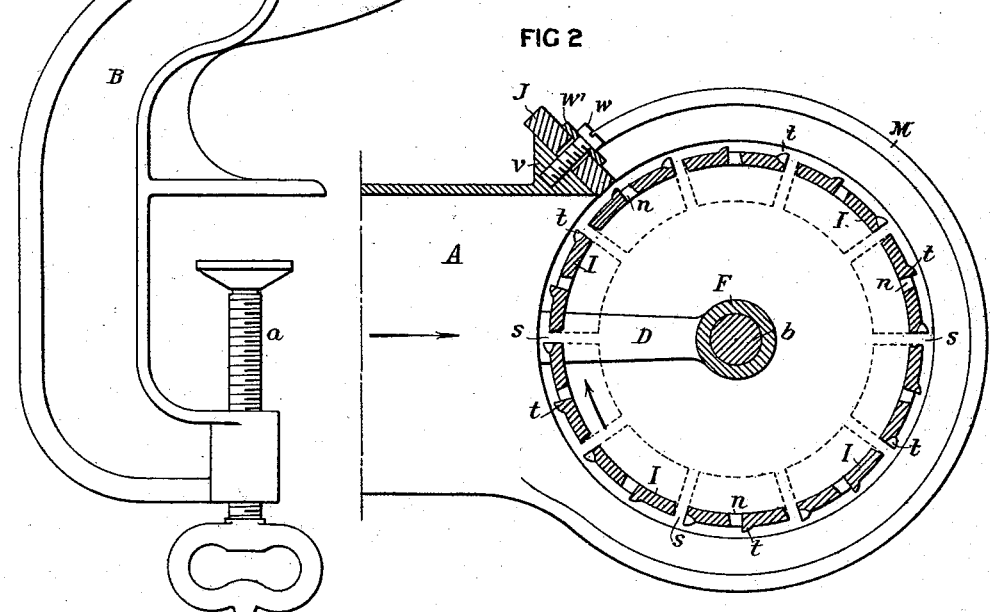

In the accompanying drawings: Figure 1, is a view partly in side elevation and partly in section of a vegetable grater constructed in accordance with my invention. Fig. 2, is a sectional plan view on the line 2—2, Fig. 1; and Fig. 3, is a perspective view of one of the grating fingers detached from the rotating disk.

A represents a guide trough composed of a horizontal bottom plate and a vertical side plate, this guide trough being secured to or cast in one piece with a clamping frame B provided with a clamp screw $a$ so that the structure can be readily applied to and secured upon the projecting portion of a table or bench.

From the clamping frame B projects an arm D which terminates in a tubular bearing F adapted for the reception of the spindle $b$ of the disk G which has a handle $d$ whereby it can be readily turned, said disk being properly supported upon the bearing F by means of a shoulder $f$ at the upper end of the spindle $b$.

Secured to and depending from the disk G is a series of grating fingers I, each having a flange $i$ at the top so that it can be secured to the disk G by means of a set screw $m$, each finger I also having a central vertical slot $n$ extending almost completely from top to bottom of the same, or it may, if desired extend completely through to the bottom of the finger, it being preferable, however, to close the slot at the bottom so that the finger will possess greater strength at that point than it would if the slot extended completely through the same. The fingers are of such size and are so located around the disk G as to provide spaces $s$ between them, and on the front edge of each grating finger as well as upon the rear edge of each slot $n$ is formed a series of projecting teeth $t$. The vertical side of the trough is thickened at $v$ so as to form a seat for a wooden block J, which is held in position by a set screw $w$ and washer $w'$, as shown in Fig. 2, and is slotted so that it can be adjusted nearer to or farther from the teeth of the grating fingers.

From the bottom plate of the trough A extends a segmental rim M which incloses the lower portion of the grating fingers and forms a trough around the same.

In using the device the vegetable to be grated is deposited in the trough A and pushed in the direction of the arrow, Fig. 2, toward the face of the drum formed by the depending fingers I, the disk G being rotated in the direction of the arrow, Fig. 2, by means of its handle $d$ so that the teeth $t$ of the grating fingers will tear away small fragments which find their way through the spaces $s$ and slots $n$ into the interior of the drum and drop from the same into a receptacle suitably located beneath it, such of the particles as do not find their way into the interior of the drum dropping into the trough M and being retained thereby until the operation is concluded. By the adjustment of the block J nearer to or farther from the grating teeth, the size of the particles can be governed, and coarse or fine grating thus effected.

The use of a number of depending grating fingers is an important feature of the invention, since each of these fingers can be readily cast without the use of a core, hence the construction of the grating drum is materially simplified, the threaded openings of the flanges $i$ of the fingers being readily and cheaply formed by suitable machinery, and ordinary machine screws being available for securing the fingers to the disk G.

Instead of forming each of the fingers with a slot $n$, there may, if desired, be a greater number of fingers separated from each other by spaces $s$, or the fingers may be of the same size as those illustrated, but without the central slot and second set of teeth, or, on the other hand, each of the grating fingers may have more than one slot with teeth at the rear edge of the same.

Having thus described my invention, I claim and desire to secure by Letters Patent—

1. A grater consisting of a frame with guide trough and bearing, and a grating drum consisting of a disk having a spindle adapted to said bearing and provided with a series of depending grating fingers separated from each other and having projecting teeth on their forward edges, substantially as specified.

2. The within described grating device consisting of a frame having a guide trough and bearing, and a disk having a spindle adapted to said bearing, said disk being provided with a series of depending grating fingers with spaces between them, each of said fingers having projecting teeth on its forward edge and having one or more vertical slots with projecting teeth at the rear edge of the same, substantially as specified.

3. The combination of the guide trough and its bearing, the grating drum having a spindle adapted to said bearing, and a block mounted on the trough and adjustable from and toward the face of the grating drum, substantially as specified.

In testimony whereof I have signed my name to this specification in the presence of two subscribing witnesses.

JOHN G. BAKER.

Witnesses:
WILLIAM A. BARR,
FRANK E. BECHTOLD.